C. K. COLBY.
Design for Watch-Case.
No. 6,585. Reissued Aug. 10, 1875.
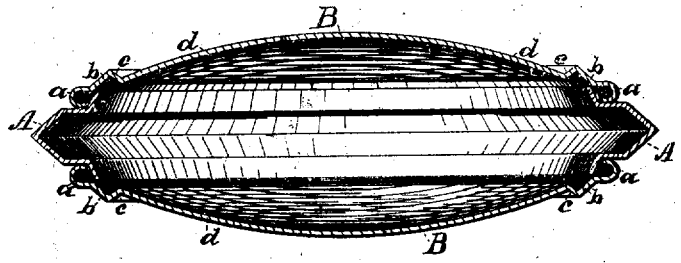
Witnesses:
Arthur C. Fraser.
W Edson Stone
Inventor:
Caleb K. Colby.
Per Burke & Fraser
Attorneys.

UNITED STATES PATENT OFFICE.

CALEB K. COLBY, OF NEW YORK, N. Y.

DESIGN FOR WATCH-CASES.

Specification forming part of Design No. 6,201, dated October 15, 1872; reissue No. 6,585, dated August 10, 1875; application filed July 29, 1875.

*To all whom it may concern:*

Be it known that I, CALEB K. COLBY, of the city, county, and State of New York, have invented a new and original Design for Watch-Cases, of which the following is a specification:

In the drawing, my new form of watch-case is represented in section, the plane of division passing through the center. This method of illustration enables me to show clearly the contour and all of the elevations and depressions which form the essential elements of my design.

The invention relates partly to a new design for the edge of the case proper, or bezel, and partly to a new design for the outer side or sides of the lids of a watch-case; also, to the combination of these elementary features in the production of a design for a watch-case as a whole.

The case proper, A, is made with a V-edge, as shown. Each of the lids B B has a sort of bead, *a*, near the periphery. Next to this bead is an inclined edge or band, *b*, from which a step, *c*, extends down to the convex or other shaped central surface *d* of the lid.

It will be observed that the band *b* is raised above the central part *d*, and lies in another plane, and that the abrupt junction of the two forms the step *c*. This step, thus formed, produces a very novel and pleasing effect, and forms one of the essential features of my design.

I am aware that beads have been used to ornament the lids of watch-cases, and I make no claim to such method of ornamentation. The effect produced upon the eye by the design embodying my step *c*, in conjunction with the band *b* and central part *d*, is widely different from that produced by a bead.

My design may be applied to hunting-cases as well as to open-faced watches.

Having thus described my design, I claim—

1. The design for the watch-case proper, A, having the V-edge, as shown.

2. The design for a watch-case lid, B, having an inclined band, *b*, raised above a central portion, *d*, to form the step *c*, substantially as shown.

3. The design for a watch-case as a whole, having the V-edged case A and the ornamental lids B B, the ornamentation on the lids consisting of the bead *a*, then the band *b*, then the step *c*, down to the central portion *d*, substantially as shown.

CALEB K. COLBY.

Witnesses:
HENRY CONNETT,
ARTHUR C. FRASER.